United States Patent [19]

Barno

[11] Patent Number: 5,595,318

[45] Date of Patent: Jan. 21, 1997

[54] COMPOSITE CONTAINER WITH IMPROVED OUTER SHELL

[75] Inventor: Keith Barno, Anniston, Ala.

[73] Assignee: Hoover Group, Inc., Alpharetta, Ga.

[21] Appl. No.: 329,870

[22] Filed: Oct. 27, 1994

[51] Int. Cl.⁶ .................................................. B65D 19/00
[52] U.S. Cl. ........................................... 220/401; 220/1.5
[58] Field of Search .................................. 220/401, 402, 220/403, 1.5, 4.13

[56] References Cited

U.S. PATENT DOCUMENTS

| | | |
|---|---|---|
| 3,964,636 | 6/1976 | Rehrig .................................. 220/401 X |
| 3,970,209 | 7/1976 | Baxter . |
| 4,054,223 | 10/1977 | Marques . |
| 4,090,633 | 5/1978 | Trubiano . |
| 4,106,626 | 8/1978 | Trubiano . |
| 4,221,296 | 9/1980 | Fell et al. . |
| 4,653,658 | 3/1987 | Karpisek . |
| 4,676,373 | 6/1987 | Schneider . |
| 4,793,519 | 12/1988 | Voorhies, Jr. . |
| 4,795,057 | 1/1989 | Jungels et al. . |
| 4,909,387 | 3/1990 | Schutz . |
| 4,930,661 | 6/1990 | Voorhies . |
| 5,002,194 | 3/1991 | Nichols . |
| 5,050,775 | 9/1991 | Marquardt .......................... 220/403 X |
| 5,060,815 | 10/1991 | Wendling ............................ 220/1.5 X |
| 5,101,995 | 4/1992 | Trubiano ............................. 220/1.5 X |
| 5,110,000 | 5/1992 | Nichols ............................... 220/1.5 X |
| 5,366,090 | 11/1994 | Schutz ................................. 220/1.5 X |

*Primary Examiner*—Steven M. Pollard
*Attorney, Agent, or Firm*—Harness, Dickey & Pierce, P.L.C.

[57] ABSTRACT

A reusable one-way shipping container. The shipping container includes a box shaped outer container of mesh material into which is received a synthetic resin inner tank. The inner tank includes an inlet fitting and a discharge fitting which are respectively positioned so that they may be accessed through a fill opening and a discharge opening in the outer container. The top wall of the outer container is defined by a pair of panels which are hingedly secured to opposing side walls of the outer container for movement between an opened position and a closed position. The open position of the panels allows the inner tank to be removed from said outer container upwardly between the side walls. The closed position of the panels retains the inner tank within said outer container.

13 Claims, 2 Drawing Sheets

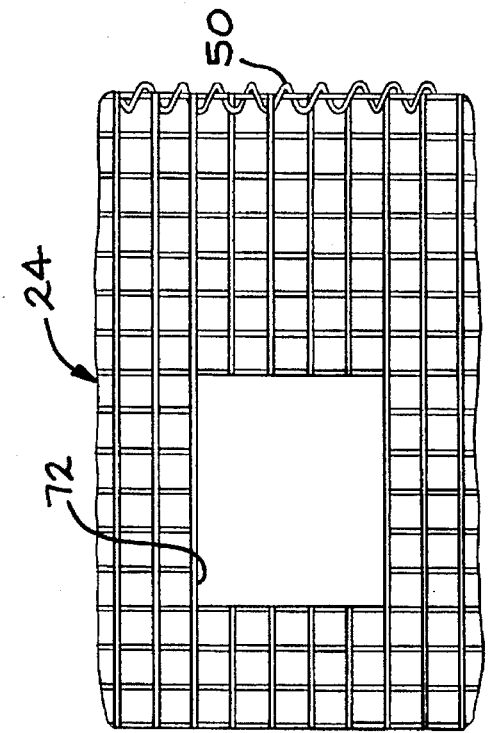
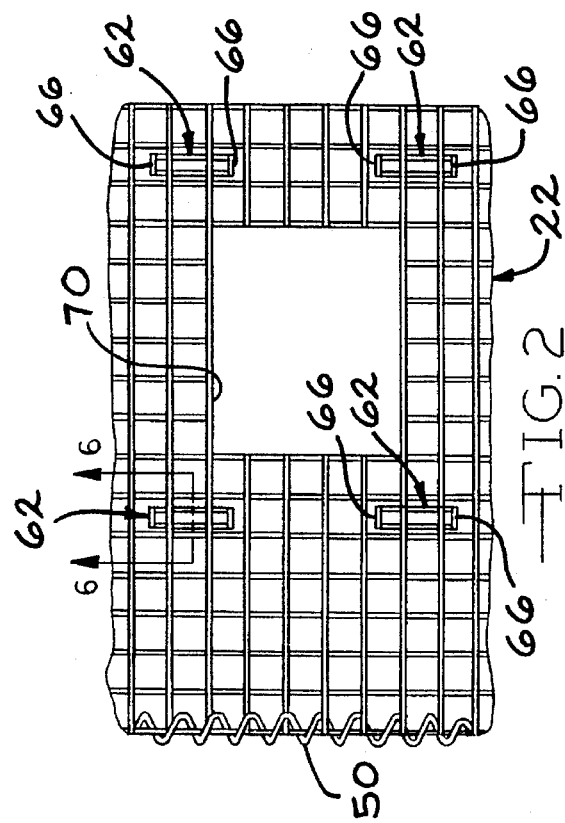
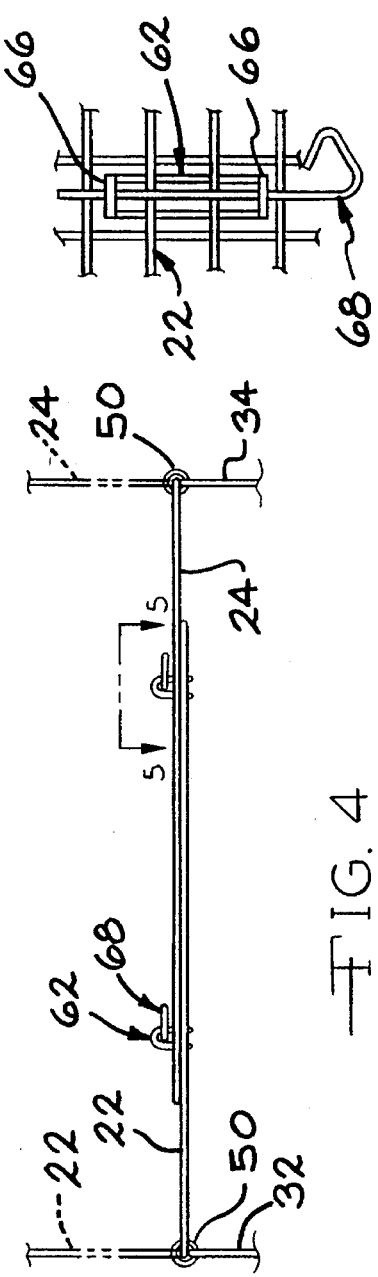

5,595,318

COMPOSITE CONTAINER WITH IMPROVED OUTER SHELL

BACKGROUND AND SUMMARY OF THE INVENTION

The present invention generally relates to the transportation and storage container. More particularly, the invention relates to a transportation and storage container for bulk fluid materials in which an inner tank can be removed from an outer shell thereby allowing the shell to be easily shipped back to the initial supplier for reuse.

Numerous industries require that bulk quantities of fluid materials, such as liquids, be easily transported and stored. While a variety of large containers are presently used, perhaps the most common continues to be the conventional fifty-five gallon drum. Notwithstanding its popularity, the fifty-five gallon drum is known to have several significant limitations. The most obvious of these deficiencies include their inefficient use of storage space, their inefficient use of transportation space, awkward handling, problems with complete discharge of the drum's contents, and numerous disposal problems associated with empty drums.

In recent years, the cubic shaped transportation container has seen significant gains in popularity. One variety of this type of container includes a metal outer container having an inner polyethylene tank. While demonstrating numerous advantages in terms of ease of use, storage and transportation, the cubic shipping container has exhibited some drawbacks. For example, when the container is reused and returned to the supplier, a large amount of transportation space is "wasted" because of the overall bulk of the empty container. If recycling of the container is desired, separation of the inner plastic tank from the outer metal shell is often difficult.

An alternative and recent development in bulk liquid shipping containers is the disposable shipping container. One such shipping container is disclosed in U.S. Pat. No. 4,793,519, which is assigned to the assignee of the present application. The container of the referenced patent consists of a rectangularly shaped outer container, formed of a corrugated paper material, in which is housed a thin walled, unitary, blow molded plastic inner tank. Constructed in this manner, the outer container structurally supports and maintains the rectangular shape of the inner plastic tank when filled. Although less expensive to produce than the previously mentioned metal shell containers, the corrugated container is strong enough to permit shipping and stacking. Upon being emptied, the paper material making up the outer container is readily separated from the inner tank for disposal and recycling purposes. While both disposable and recyclable, in a long term continuous supply arrangement, the disposability and/or recyclability of the corrugated paper shipping container may not be the most financially beneficial type of container.

A result of this has been the development of reusable, one-way liquid shipping containers. These containers are shipped are filled and from the liquid distributor or supplier to the various end users. Once the liquids have been consumed and emptied from the containers, at least a portion of the container is returned to the liquid supplier for refilling and subsequent use.

One example of a reusable, one-way shipping container is disclosed in U.S. Pat. No. 5,002,194. This patent is also commonly assigned to the assignee of the present invention and is herein incorporated by reference. The shipping container disclosed in the '194 patent includes a rectangularly shaped, wire mesh outer container in which is housed a unitary, blow molded, plastic inner tank. After complete discharge of the contents from the container's inner tank, the top wall of the outer container is completely removed from the side walls of the outer container allowing the collapsed inner tank to be removed. The removed inner tank may then be either discarded or recycled, which ever is most cost advantageous to the end user. With the inner tank removed, the outer tank is capable of being folded upon itself so that transportation space during its return to the original supplier for subsequent reuse is maximized. Once received by the original supplier, the outer container is unfolded, a new inner tank is placed therein and the container is refilled and reshipped.

While the above reusable shipping container has met with considerable market success, it has been found that the necessity of removing the top wall to permit withdrawal of the inner tank and folding of the outer container, and then reattaching the top wall prior to shipping the collapsed container back to the liquid distributor, tends to be a time consuming process.

In view of the above and other limitations, it is an object of the present invention to provide a reusable container for use in the one-way shipment of bulk liquid materials.

It is also an object of this invention to provide a reusable, one-way bulk liquid shipping container that is durable, yet inexpensive to construct.

A further object of this invention is to provide a reusable, one-way bulk liquid shipping container which is capable of efficiently occupying a minimum amount of space during subsequent return to the liquid supplier.

Still another object of this invention is to provide a reusable, one-way bulk liquid shipping container which readily allows its inner tank to be removed therefrom for recycling or disposal purposes.

In achieving the above and other objects, the present invention provides for a shipping container in which a unitary, blow molded, synthetic resin or plastic inner tank is positioned inside of a wire mesh outer container or shell. The outer container includes a bottom wall, upright side walls and a top. The inner tank can be self-supportive or can have side walls which are substantially thin and thus prevented from being self-supportive. In the latter case, the side walls of the outer container are constructed of a sufficient gauge to structurally support the inner tank when it is located therein and filled with a liquid. The inner tank is also equipped with an inlet fitting and a discharge fitting which respectively extend into fill and discharge openings defined in the walls of the outer container.

The top wall of the outer container is provided in a manner which readily allows the inner tank to be removed once empty. More specifically, the top wall of the outer container includes a pair of panels which are rotatably secured to opposing side walls of the container. The panels are movable from a substantially horizontal or closed position where they overlap one another and extend across the top of the inner container to an open position where they allow the inner tank to be removed. The panels are secured to one another by a latch and pin mechanism that prevents them from being inadvertently opened.

Once the contents of the inner tank have been emptied and it is desired to ship the outer container back to the liquid supplier, the pin and latch mechanism are easily disengaged and the two panels moved to a substantially upright or open position. In this position, the inner container is easily removed up through the top opening defined between the side walls of the outer container. With the inner tank removed, the outer tank is capable of being folded upon itself into a substantially flat and reduce height condition. This condition maximizes transportation space during its return to the liquid supplier.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIGS. 2 and 3 are plan views of the panels which form the top wall of the shipping container illustrated in FIG. 1;

FIG. 4 is a side elevational view of a portion of the shipping container seen in FIG. 1 showing the closed position of the panels forming its top wall as well as their open position;

FIG. 5 is a plan view taken substantially along line 5—5 in FIG. 4 of the pin and latch mechanism which is used to secure the panels in their closed position and to one another; and FIG. 6 is a sectional view taken substantially along line 6—6 in FIG. 2 illustrating the latch portion of the pin and latch mechanism utilized with the present invention.

DETAILED DESCRIPTION OF THE PREFERRED EMBODIMENT

Figure 1:
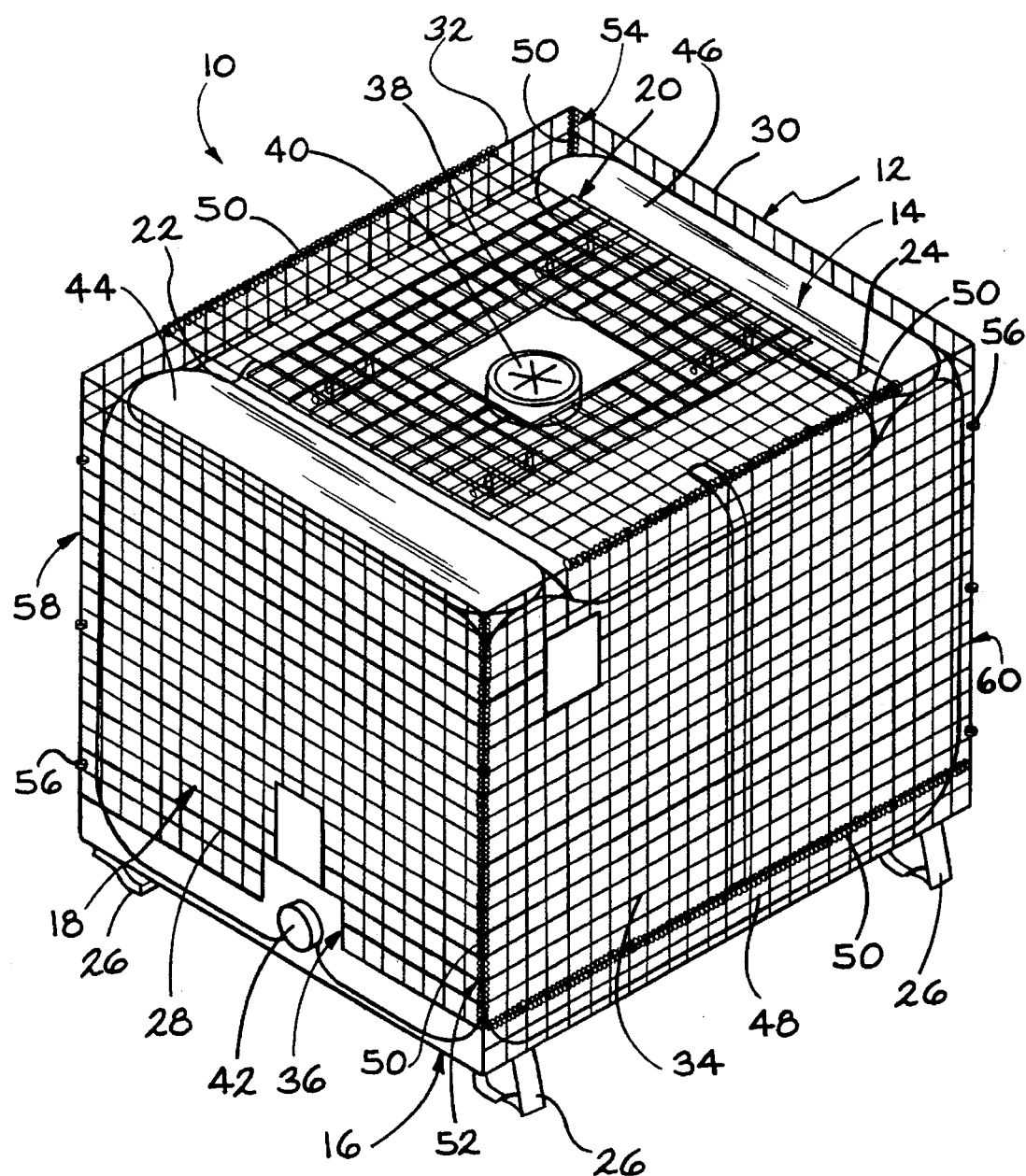
FIG. 1 is a perspective view of a shipping container embodying the principles of the present invention.

Referring now to the drawing, a composite shipping container embodying the principles of the present invention is illustrated in FIG. 1 and generally designated at 10. The composite container 10 is principally comprised of an outer container 12 and an inner tank 14. The outer container 12 defines a protective and supportive enclosure for the inner tank 14 which is the actual receptacle for the liquids being shipped and stored.

Illustrated as being formed from a wire mesh material, the outer container 12 includes bottom wall 16, side walls 18 and a top wall 20 which cooperate to define a receiving space for the inner container 14. The top wall 20 itself is further made up of a pair of separate top panels 22 and 24 which cooperate to define the top wall 20.

Dependent legs 26 extend downward, generally from the corners of the bottom wall 16 of the container 12. The legs 26 function as risers so as to elevate the container 10 up off of the floor of a warehouse or trailer. The legs 26 are also spaced so that the tines of a forklift truck can be inserted under the container 10 thereby facilitating the ease with which the container 10 is handled during transportation and storage. While shown as being generally located in the four corners of the container 10, the legs 26 could alternatively be provided such that they extend substantially continuously around the bottom wall 16. As such, the legs 26 could be of a tubular or other construction and could be formed as part of an integral pallet support structure, including the bottom wall 16, for the container 10. If provided in this alternative manner, the bottom wall 16 itself need not be made of wire mesh material. Instead, the bottom wall 16 could be formed from stamped sheet metal or molded plastic, either of which could be secured to the legs 26.

The side walls 18 of the outer container 12, designated as a front wall 28, a rear wall 30, a left wall 32 and a right wall 34, are dimensioned such that opposing pairs of the side walls (28, 30 and 32, 34) correspond in width with one another while all of the side walls 18 exhibit the same height. For reasons further described below, a discharge opening 36 is formed in the front wall 28 and located substantially adjacent to the bottom wall 16. The top wall 20 has a central fill opening 38 defined by two corresponding openings in the two panels 22 and 24 which define it. While the location of the discharge and fill openings 36 and 38 are specifically designated and shown in the present embodiment, it will be appreciated that these locations may be altered so as to accommodate the fill and discharge fittings of the specific inner tank 14 being used to form the container 10.

The inner tank 14 is a liquid-tight container and is preferably constructed out of a synthetic resin as a unitary, blow molded container with dimensions that generally correspond to those of the outer container 12. The liquid-tight inner tank 14 is positioned within the outer container 12 so that a fill cap and fitting 40 on the top of the tank 14 can be easily accessed through the fill opening 38 defined in the top wall 20 of the outer container 12. A discharge fitting 42 is formed on the inner tank 14 so that it will correspond with the discharge opening 36 defined in the front wall 28 of the outer container 12. Preferably, walls of the inner tank 14 are of a thin construction such that, when filled with a liquid, the tank 14 is incapable of supporting itself upright without the structural aid of the side walls 18 of the outer container 12. In this manner, costs associated with producing and discarding the inner tank 14 are minimized to allow it to be more effectively recycled than reused. As illustrated, the inner tank 14 is provided with reinforced, thickened regions 44 and 46 extending transversely along the tank's top front and rear edges. The thickened regions 44 and 46 provide a vapor expansion area for the liquid in the inner tank 14 and also provide rigidity for the top of the inner tank 14.

The shipping container 10 permits at least two full containers 10 to be stacked upon one another. This is achieved by positioning the dependent legs 26 of the upper container 10 on the side walls 18 of the lower container 10. If desired, the side walls 18 of the lower container 10 can be provided with extra support wires or other structures to reinforce those areas where the dependent legs 26 of the upper container 10 engage the side walls 18 of the lower container 10.

The bottom wall 16 is also provided with two upwardly extending portions along opposing edges, designated as edge portions 48. The edge portions 48 providing a mounting portion for two of the side walls 18. In the illustrated embodiment, the left and right walls 32 and 34 are fastened along their lower periphery by helical wire connectors 50 to the edge portions 48. The helical wire connectors 50 resemble elongated springs and define a horizontal rotational axis for the left and right side walls 32 and 34. While a helical wire connector wire 50 is used in the present embodiment, it is readily apparent that other conventional means permitting this rotational attachment can be employed without compromising the operability of the invention.

Rotatably connected by another helical wire connector 50, except about a vertical axis, the front wall 28 is fastened to a front edge 52 of the right wall 34. Similarly, the left wall 32 is rotatably fastened by a helical wire connector 50 about a vertical axis defined along the rear edge 54 of the left wall 32. The front wall 28 and the rear wall 30 are further fastened by snap loop connectors 56 along the front edge 58 of the left wall and the rear edge 60 of the right wall, respectively.

Completing the assembly of the shipping container 10, the two panels 22 and 24 of the top wall 20 are rotatable attached, also by helical wire connectors 50, to the upper edge of the left and right walls 32 and 34. As seen in FIGS. 1 and 4, when laid horizontally, the panels 22 and 24 overlap one another and cooperate so as to form a composite structure extending completely across the top of the inner tank 14. For increased strength, the panels 22 and 24 preferably overlap one another between 25–75% of the width of the inner container 14. One of the panels, panel 22 in the illustrated embodiments, has four latch member 62 welded at 64 to its underside such that each latch member 62 has a pair of loop portions 66 which extend upward through openings in the mesh material forming the panel 22, generally normal to the surface defined by the panel 22. When the other panel 24 is folded down so that it overlaps the first panel 22, the loop portions 66 extend up through openings defined in the mesh material forming the panel 24.

The loop portions 66 of the latch member 62 are configured to receive a pin 68 which is inserted transversely through the loop portions 66 generally parallel to the surfaces of the panels 22 and 24. In this way, the pins 68 prevent the panels 22 and 24, and the outer container 12, from being inadvertently opened.

In the illustrated embodiment, the four latch members 62 which are generally equally located around an opening 70 defined in the panel 22. This opening 70 is located on the panel so that when the other panel 24 is lowered on top of it, the opening 70 will correspond with an opening 72 defined in that panel 24. These openings 70 and 72 cooperate to define the fill opening 38 mentioned above.

Upon being emptied, the inner tank 14 is removed from the shipping container 10 by first removing the pins 68 from the latch member 62 and then raising the panels 24 and 22 from their closed positions, where they extend across the inner tank 14, to their open positions, generally designated in phantom in FIG. 4, which permit easy withdrawal of the inner tank 14 upwardly out of the outer container 12. The panels 22 and 24 can be further rotated so that they extend downward along the left and right walls 32 and 34. Once the inner tank 14 has been removed, it is possible for the outer container 12 to be folded upon itself into a generally flat structure with a reduced thickness and returned to the liquid supplier. The flat, folded outer container 12 will occupy only a minimal amount of cargo space during return shipment.

In order to fold the outer container 12 upon itself once the panels 22 and 24 have been moved to their open position, the snap loop connectors 56 are opened allowing the front and rear walls 28 and 30 to be folded back upon the right and left walls 34 and 32. The right and left walls 32 and 34 are then folded down upon the bottom wall 16 and each other. In this folded condition, the outer container 12 can be easily and conveniently returned to the original liquid supplier without significantly wasting space during transportation. Once received by the original supplier, the outer container 12 is unfolded, a new inner tank 14 is inserted into the outer container 12 and filled with liquid.

While the above description constitutes the preferred embodiment of the present invention, it will be appreciated that the invention is susceptible to modification, variation and change without departing from the proper scope and fair meaning of the accompanying claims.

I claim:

1. A reusable one-way shipping container comprising:
    a generally rectangular box shaped outer container of mesh material and including a bottom wall, side walls, and a top wall, said bottom wall having legs extending downward therefrom to support said shipping container a distance above a support surface, said top wall being defined by at least two opposing top panels, at least one of said top panels having a fill opening defined therein, one of said side walls having a portion defining a discharge opening generally adjacent to said bottom wall;
    a synthetic resin inner tank adapted for the storage of fluids therein, said inner tank being positionable within said outer container and being removable therefrom, said inner tank including an inlet fitting permitting the introduction of fluids into said inner tank and located on said inner tank so to be accessible through said fill opening when said inner tank is within said outer container, said inner tank also including a discharge fitting permitting the dispensing of fluids from said inner tank, said discharge fitting located on said inner tank to be accessible through said discharge opening;
    each of said top panels being rotatably secured one of said side walls for movement between an opened position and a closed position, said open position allowing said inner tank to be withdrawn out of said outer container upwardly between said side walls, said top panels extending at least partially across the top of said inner tank and overlapping one another when in said closed position; and
    securing means for releasably securing said top panels in said closed position and preventing inadvertent movement of said top panels from said closed position to said open position thereby retaining said inner tank within said outer container.

2. A shipping container as set forth in claim 1 wherein said top panels are rotatably secured to opposing ones of said side walls.

3. A shipping container as set forth in claim 1 wherein said top panels extend only part way between an opposing pair of said side walls.

4. A shipping container as set forth in claim 1 wherein said outer container includes means for permitting said outer container to substantially fold upon itself when said inner tank is removed therefrom.

5. A shipping container as set forth in claim 1 wherein said overlap is over a distance which is at least 25% of the length of each of said panels.

6. A shipping container as set forth in claim 1 wherein said overlap is over a distance which is substantially between 25% and 75% of the length of each of said panels.

7. A shipping container as set forth in claim 1 wherein said securing means includes a latch member on one of said top panels, said latch member having at least one portion which extends through an opening defined the other of said top panels.

8. A shipping container as set forth in claim 7 wherein said top panels are of a mesh material and said portion of said latch member extends through an opening occurring said mesh material.

9. A shipping container as set forth in claim 7 wherein said securing means includes a pin, said pin engaging said portion of said latch member extending through the other of said top panel and retaining said top panels in engagement with one another.

10. A shipping container as set forth in claim 7 wherein said securing means includes a plurality of said latch members on one of said top panels, said latch members being spaced about said fill opening.

11. A shipping container as set forth in claim 1 wherein a fill opening is defined in each of said top panels, said fill openings being located so as to substantially coincide with one another when said top panels are in said closed position.

12. A shipping container as set forth in claim 1 wherein said outer container is formed of a wire mesh material.

13. A reusable one-way shipping container comprising:
 a generally rectangular box shaped outer container constructed of a mesh material, said outer container including a bottom wall, side walls, and a top wall, said bottom wall having legs extending downward therefrom to support said shipping container, one of said side walls having a portion defining a discharge opening generally adjacent to said bottom wall, said top wall being defined by two overlapping top panels, said top panels each having a fill opening defined therein and being rotatably secured to an opposing pair of said side walls for movement between an open position and a closed position, in said open position said outer container having opened top, said panels extending at least partially between said opposing side walls when in said closed position and thereby defining said top wall of said outer container and a closed structure;
 a synthetic resin inner tank adapted for the storage of fluids therein, said inner tank being positionable within said outer container and being removable therefrom upwardly between said side walls of said outer container when said top panels are in said open position, said inner tank being retained in said outer container and said top panels extending across the top thereof when said top panels are in said closed position, said inner tank including an inlet fitting permitting the introduction of fluids into said inner tank and located on said inner tank so to be accessible through said fill opening when said inner tank is within said outer container, said inner tank also including a discharge fitting permitting the dispensing of fluids from said inner tank, said discharge fitting located on said inner tank to be accessible through said discharge opening; and securing means for releasably securing said top panels in said closed position and preventing inadvertent movement of said top panels from said closed position to said open position.

\* \* \* \* \*